United States Patent
Sooji

(10) Patent No.: US 11,403,205 B1
(45) Date of Patent: Aug. 2, 2022

(54) SYSTEMS AND METHODS FOR SOURCE CODE ERROR REOCCURRENCE PREVENTION

(71) Applicant: FMR LLC, Boston, MA (US)

(72) Inventor: Krishnaraj Sooji, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/170,404

(22) Filed: Feb. 8, 2021

(51) Int. Cl.
*G06F 11/36* (2006.01)
*G06F 8/71* (2018.01)
*G06F 16/23* (2019.01)

(52) U.S. Cl.
CPC ............ *G06F 11/3624* (2013.01); *G06F 8/71* (2013.01); *G06F 16/2358* (2019.01)

(58) Field of Classification Search
USPC ........................................................ 717/124
See application file for complete search history.

(56) References Cited

U.S. PATENT DOCUMENTS

| 9,575,764 B1 | 2/2017 | Turner et al. |
| 2007/0283321 A1 | 12/2007 | Hegde et al. |
| 2018/0129494 A1* | 5/2018 | Odvody ................... G06F 8/71 |
| 2019/0306173 A1 | 10/2019 | Reddy et al. |

* cited by examiner

*Primary Examiner* — John Q Chavis
(74) *Attorney, Agent, or Firm* — Proskauer Rose LLP

(57) ABSTRACT

Systems and methods for preventing source code error reoccurrence. The method includes receiving a source code file including a record of modifications of the source code and a record of source code errors. The method also includes storing the source code file in a database. The method further includes receiving a modified source code file including an identification of a user that created the modified source code file on a user device. The method also includes determining a portion of the source code file that has been modified based on a comparison of the source code file and the modified source code file. The method further includes determining whether the portion of the source code file that has been modified corresponds to an error in the record of source code errors. The method also includes generating a notification corresponding to the error for display on the user device.

20 Claims, 6 Drawing Sheets

SYSTEMS AND METHODS FOR SOURCE CODE ERROR REOCCURRENCE PREVENTION

FIELD OF THE INVENTION

The present invention relates generally to systems and methods for preventing source code error reoccurrence, including systems and methods for preventing source code error reoccurrence using a source code management system.

BACKGROUND OF THE INVENTION

Software development is the process of conceiving and writing source code during the creation of software applications. During software development, developers make changes to the source code in order to, for example, add features to a software application. In some situations, changes to the source code results in software bugs or errors during runtime. Developers often spend a considerable amount of time finding and correcting these errors.

Modern software tools provide developers with code conflict resolution when one or more developers are working in a distributed environment. These software tools help developers avoid conflict in near real time and present the context of the conflict to the developers. However, these software tools do not actively monitor source code errors and corresponding fixes over time. Therefore, there is a need for software tools that are capable of identifying and maintaining a record of source code errors in order to alert developers and prevent source code error reoccurrence.

SUMMARY OF THE INVENTION

Accordingly, an object of the invention is to provide developers systems and methods for preventing software error reoccurrence. For example, it is an object of the invention to provide developers systems and methods for continuous monitoring of source code development in order to detect source code changes. It is an object of the invention to provide developers systems and methods for alerting developer communities of source code changes in order to prevent source code error reoccurrence. It is an object of the invention to provide developers systems and methods for storing source code changes in a centralized repository.

In some aspects, a computerized method for preventing source code error reoccurrence using a source code management system includes receiving, by a server computing device, a source code file including a record of modifications of the source code and a record of source code errors. The method further includes storing, by the server computing device, the source code file in a database. The method also includes receiving, by the server computing device, a modified source code file. The modified source code file includes an identification of a user that created the modified source code file on a user device.

Further, the method includes determining, by the server computing device, a portion of the source code file that has been modified based on a comparison of the source code file and the modified source code file. The method also includes determining, by the server computing device, whether the portion of the source code file that has been modified corresponds to an error in the record of source code errors.

Further, the method includes, in response to determining that the portion of the source code file that has been modified corresponds to an error in the record of source code errors, generating, by the server computing device, a notification corresponding to the error in the record of source code errors. The method also includes generating, by the server computing device, for display the notification on the user device.

In some embodiments, the server computing device is further configured to store the modified source code file in the database. For example, in some embodiments, the server computing device is further configured to add the portion of the source code file that has been modified to the record of modifications of the source code.

In some embodiments, the notification includes at least one of an email to the user or a message proximate the portion of the source code file that has been modified. For example, in some embodiments, the email includes the portion of the source code file that has been modified, the record of modifications of the source code, and the record of source code errors.

In some embodiments, the notification is a push notification to the user device. For example, in some embodiments, the push notification includes the portion of the source code file that has been modified, the record of modifications of the source code, and the record of source code errors.

In some embodiments, the server computing device is further configured to detect whether the user is attempting to commit the modified source code file. For example, in some embodiments, the server computing device is further configured to generate a second notification corresponding to the error in the record of source code errors. In other embodiments, the server computing device is further configured to prevent the commit of the modified source code file.

In some aspects, a source code management system for preventing source code error reoccurrence includes a server computing device communicatively coupled to a user device and a database over a network. The server computing device is configured to receive a source code file including a record of modifications of the source code and a record of source code errors. The server computing device is also configured to store the source code file in the database.

Further, the server computing device is configured to receive a modified source code file. The modified source code file includes an identification of a user that created the modified source code file on the user device. The server computing device is also configured to determine a portion of the source code file that has been modified based on a comparison of the source code file and the modified source code file. The server computing device is further configured to determine whether the portion of the source code file that has been modified corresponds to an error in the record of source code errors.

Further, the server computing device is configured to, in response to determining that the portion of the source code file that has been modified corresponds to an error in the record of source code errors, generate a notification corresponding to the error in the record of source code errors. The server computing device is also configured to generate for display the notification on the user device.

In some embodiments, the server computing device is further configured to store the modified source code file in the database. For example, in some embodiments, the server computing device is further configured to add the portion of the source code file that has been modified to the record of modifications of the source code.

In some embodiments, the notification includes at least one of an email to the user or a message proximate the portion of the source code file that has been modified. For example, in some embodiments, the email includes the portion of the source code file that has been modified, the record of modifications of the source code, and the record of source code errors.

In some embodiments, the notification is a push notification to the user device. For example, in some embodiments, the push notification includes the portion of the source code file that has been modified, the record of modifications of the source code, and the record of source code errors.

In some embodiments, the server computing device is further configured to detect whether the user is attempting to commit the modified source code file. For example, in some embodiments, the server computing device is further configured to generate a second notification corresponding to the error in the record of source code errors. In other embodiments, the server computing device is further configured to prevent the commit of the modified source code file.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for preventing software error reoccurrence. The system and methods can include mechanisms or methods for continuous monitoring of source code development in order to detect source code changes. The systems and methods described herein can provide developers systems and methods for alerting developer communities of source code changes in order to prevent source code error reoccurrence. The systems and methods described herein can provide developers systems and methods for storing source code changes in a centralized repository.

Figure 1:
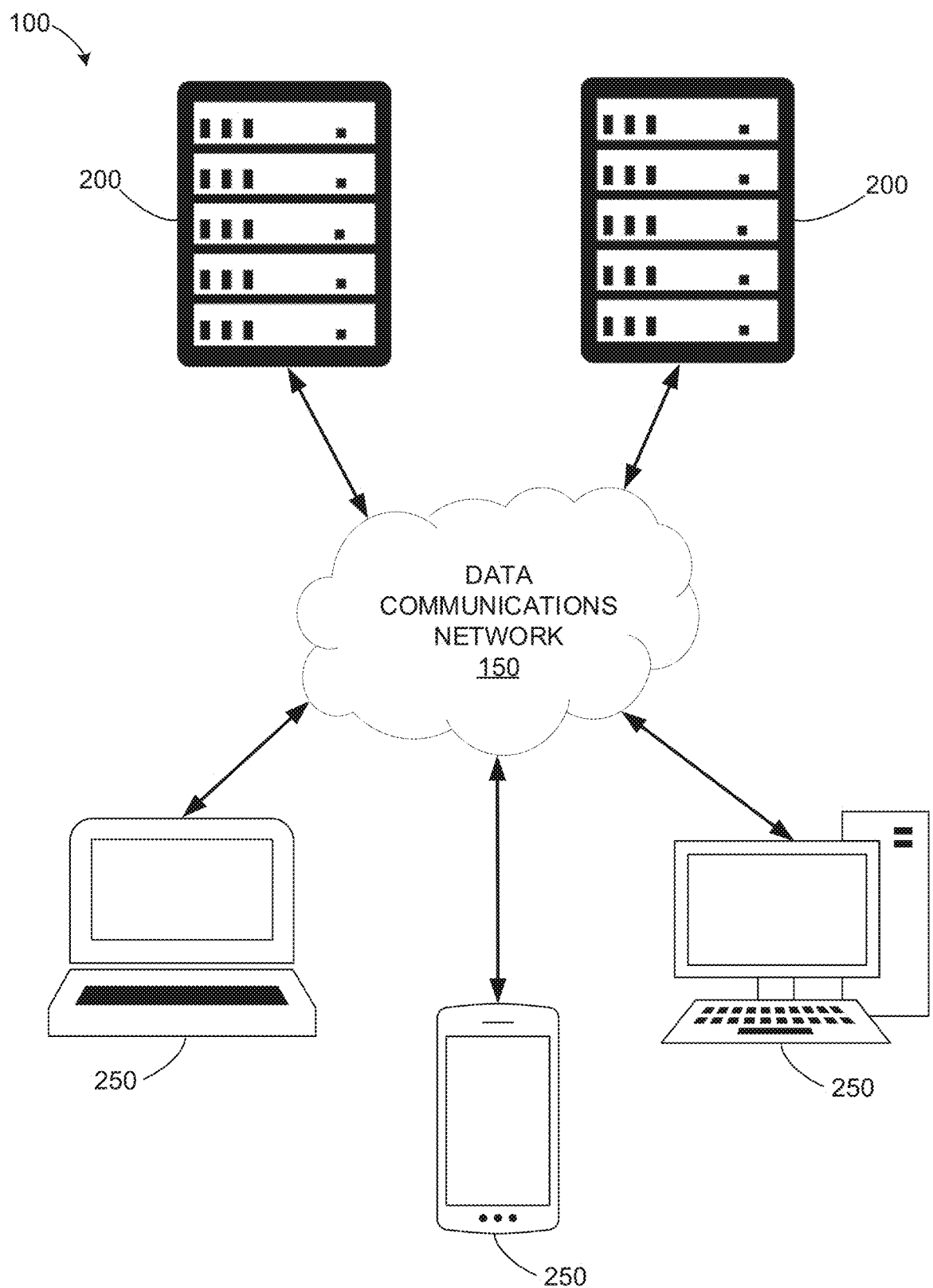
FIG. 1 is a block diagram of an exemplary data communications network, according to embodiments of the technology described herein.
Figure 2:
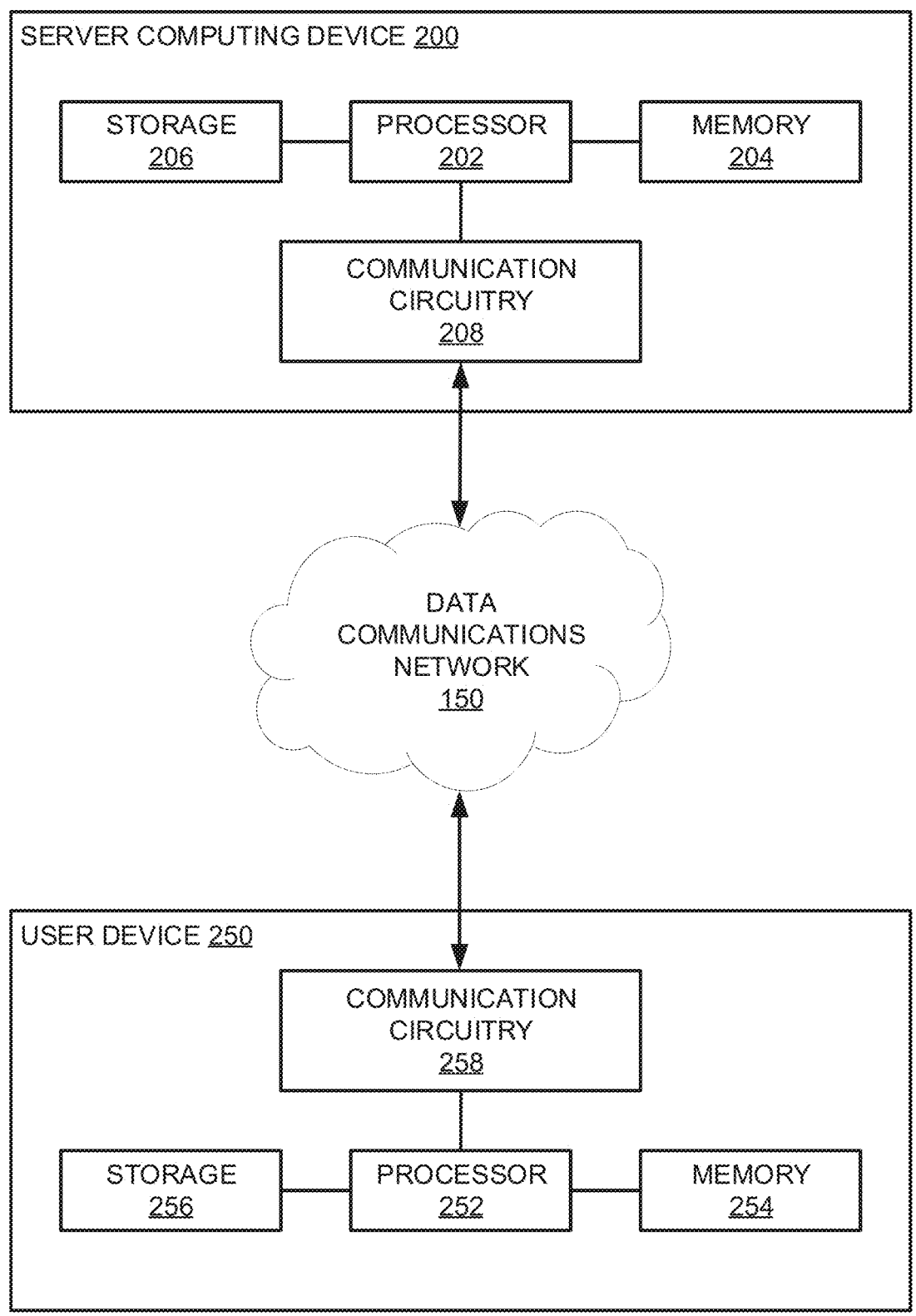
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

Figure 3:
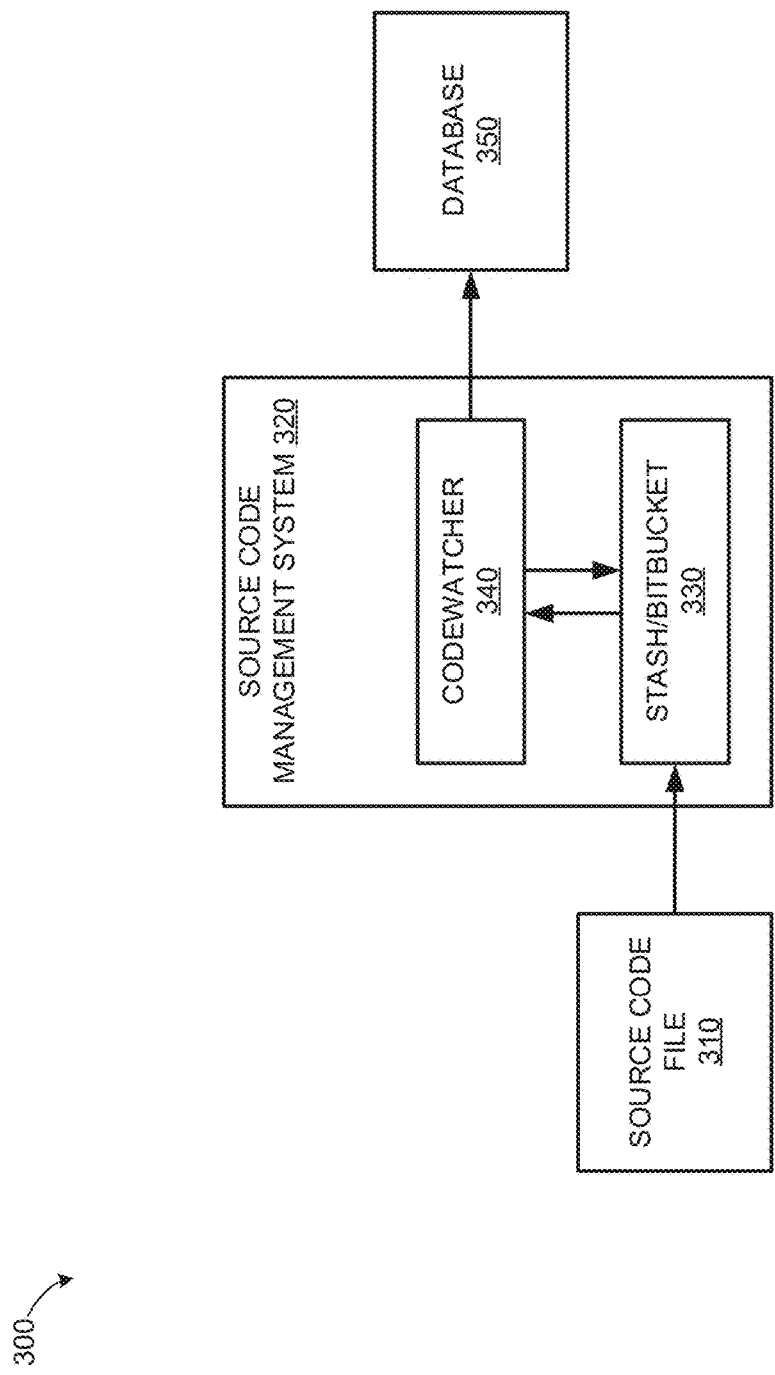
FIG. 3 is a diagram showing a visualization of an exemplary source code management system, according to embodiments of the technology described herein.
Figure 4:
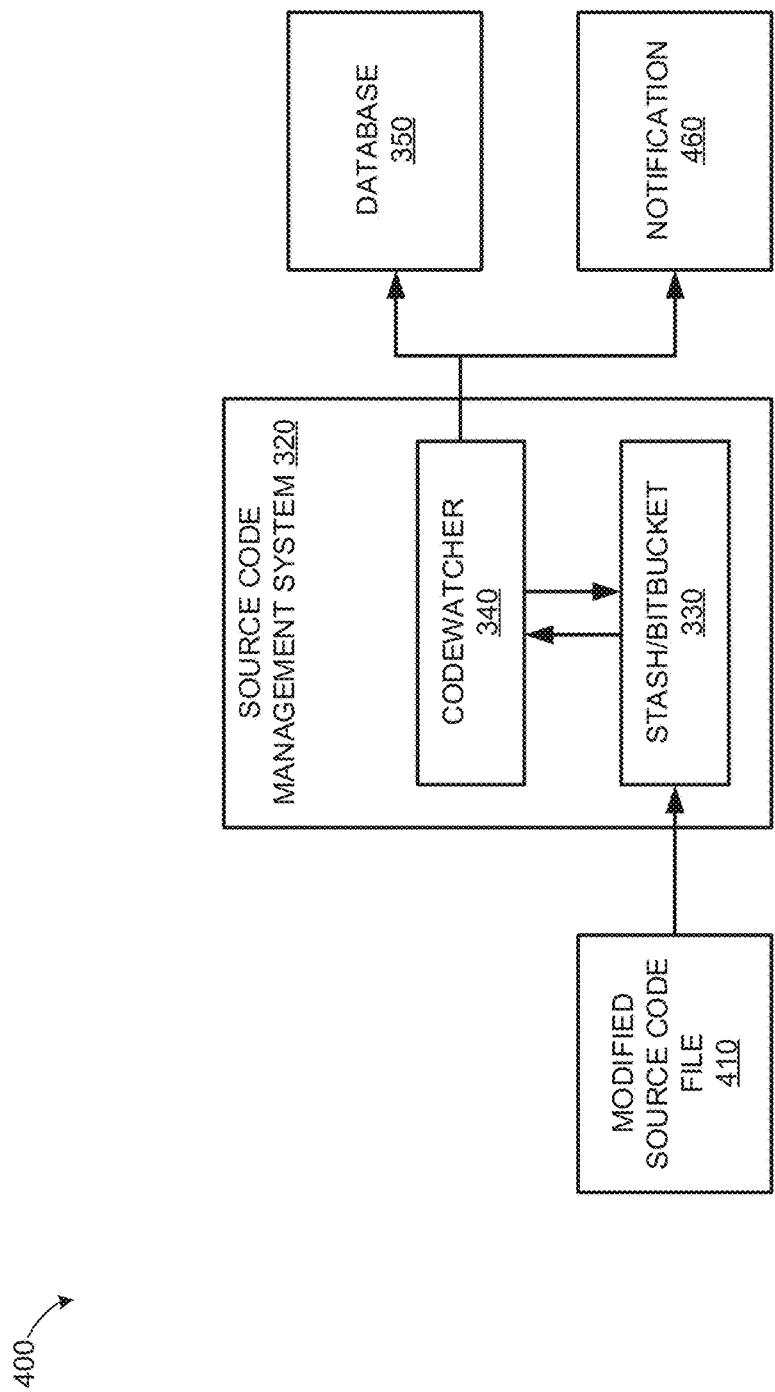
FIG. 4 is a diagram showing a visualization of exemplary source code management system, according to embodiments of the technology described herein.

The systems and methods described herein allow for a developer to prevent software error reoccurrence using a source code management system. A developer is a user that writes code and commits changes to source code systems. For example, FIGS. 3 and 4 illustrate an exemplary architecture for preventing software error reoccurrence using communications system 100. The source code management system allows for continuous monitoring of issue fixes and registers the issue fixes in a database or other system of records. For example, the source code management system allows for systematically identifying issue and/or error fixes in hotfix and/or bugfix branches of the source code. In some embodiments, the source code management system allows for systematically identifying issue and/or error fixes in feature enhancement branches of the source code.

As shown in FIG. 3, when developers submit source code files 310 to be committed, source code management system 320 analyzes the source code files 310 and stores details of the analysis in database 350. In some embodiments, source code management system 320 includes subsystems Stash/Bitbucket 330 and CodeWatcher 340. In some embodiments, Stash/Bitbucket 330 is a GIT-based source code management system which allows developers to create branches for features/bugfixes/hotfixes. In some embodiments, Stash/Bitbucket 330 also provides webhooks for any registered systems to get alerts with every commit pushed to communications system 100.

In some embodiments, CodeWatcher 340 is a subsystem which receives notifications from Stash/Bitbucket 330 for every code commit and analyzes branches for source code changes. For example, as shown in FIG. 4, when a developer submits a modified source code file 410, CodeWatcher 340 analyzes the modified source code file 410 and identifies any source code changes. In the event that CodeWatcher 340 identifies source code changes that would result in error reoccurrence, source code management system 320 issues notification 460 to alert the developer of the identified error reoccurrence. As shown in FIGS. 3 and 4, the source code management system allows for continuously registering past issues and fixes and continuously monitoring new feature enhancements to prevent past issues.

Figure 5:
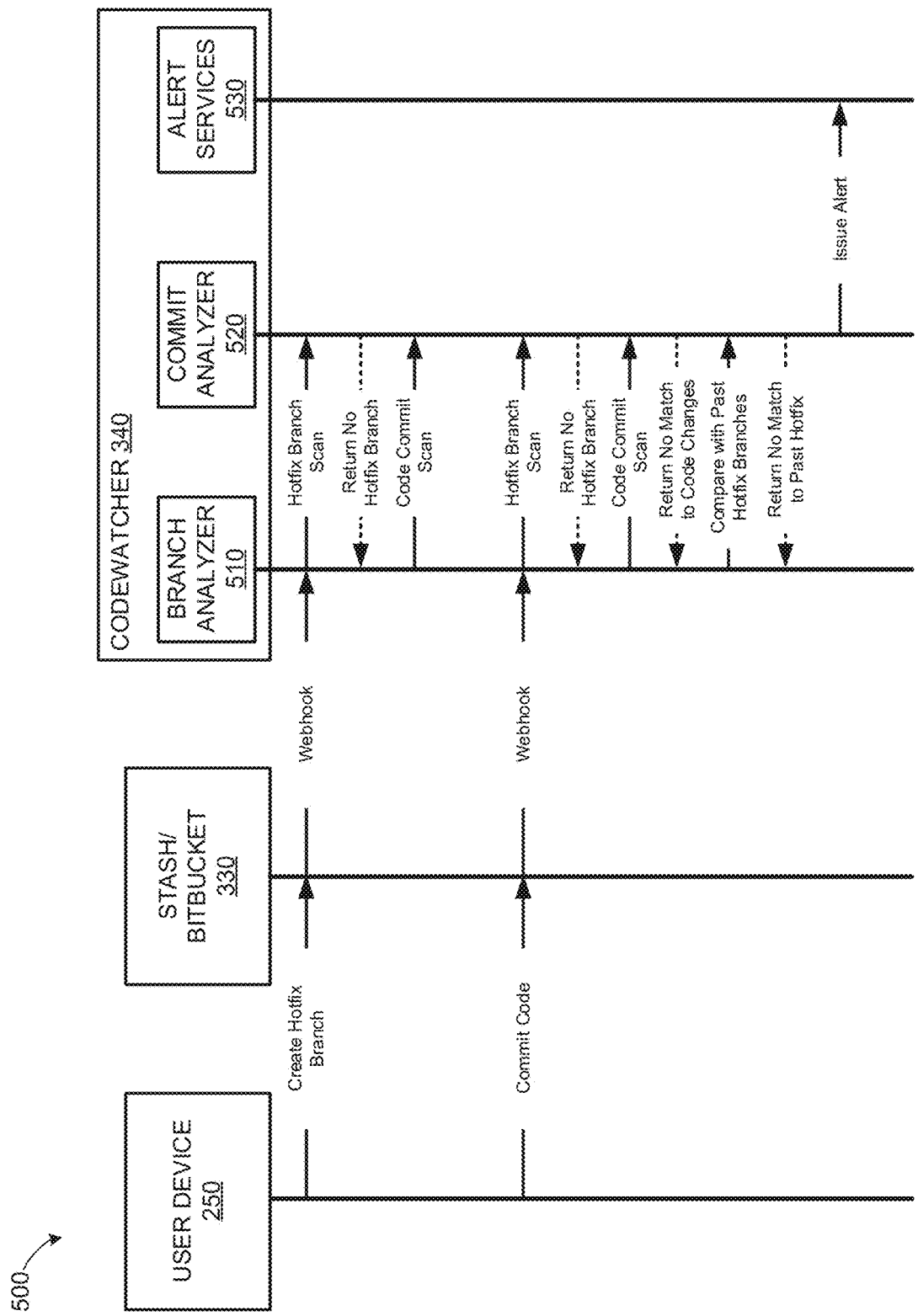
FIG. 5 is a diagram showing a visualization of an exemplary sequence for preventing source code error reoccurrence, according to embodiments of the technology described herein.

As shown in FIG. 5, in some embodiments, CodeWatcher 340 includes various units that handle analyzing branches, code commit details, and mapping services to past issue fixes. These units also handle alerting developers via email or comments on software development tools. For example, branch analyzer 510 is a unit of CodeWatcher 340 which monitors the list of branches of source repository and identifies if any branches includes hotfixes or bugfixes. If there are branches with hotfixes or bugfixes, branch analyzer 510 registers those branches and stores them in database 350.

Commit analyzer 520 is a unit of CodeWatcher 340 which gets called if branch analyzer 510 identifies any branches with hotfixes or bugfixes. If called, commit analyzer 520 scans the commit details and retrieves a list of lines of code that have been changed. Commit analyzer 520 then compares the lines of code that have been changed between the original source code file 310 and the modified source code file 410, and triggers a notification 460.

Alert services 530 is a unit of CodeWatcher 340 which gets called if commit analyzer 520 triggers a notification 460. If called, alert services 530 identifies the developer trying to commit the modified source code file 410 and issues a notification 460 that includes all of the details of the past issue and directs the developer to be cautious with changes to prevent past issue reoccurrence. For example, notification 460 can be an email to the developer or a comment on the software development tool that the developer is using to commit the code. In some embodiments, notification 460 can be a push notification to the user device 250 that the developer is using to commit the code.

Figure 6:
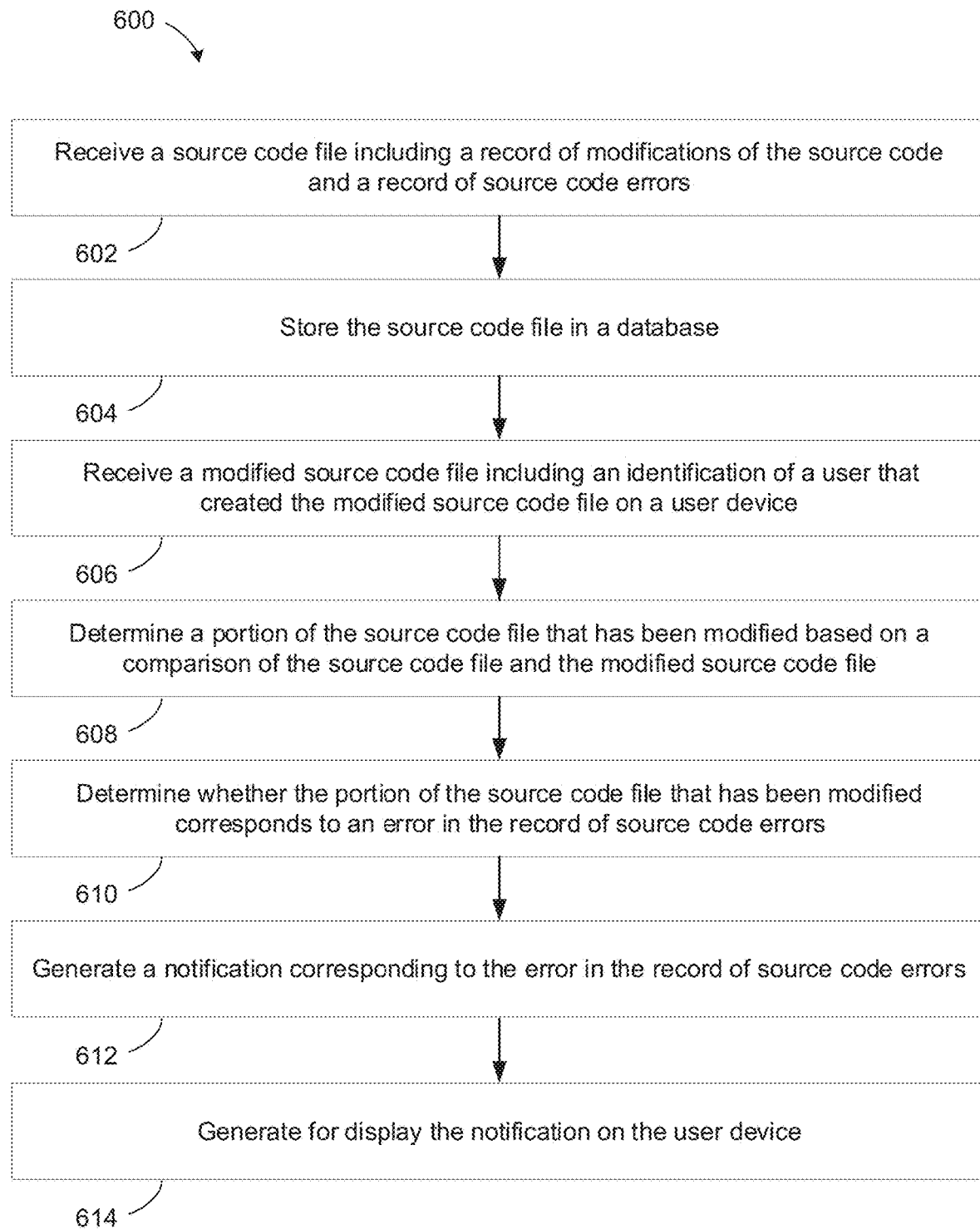
FIG. 6 is a flow diagram of a computer-implemented method for preventing source code error reoccurrence using an exemplary source code management system, according to embodiments of the technology described herein.

Referring to FIG. 6, a process 600 for preventing source code error reoccurrence using a source code management system 320 is illustrated. The process 600 begins by receiving, by a server computing device 200, a source code file 310 including a record of modifications of the source code and a record of source code errors in step 602. Process 600 continues by storing, by the server computing device 200, the source code file 310 in a database 350 in step 604.

Process 600 continues by receiving, by the server computing device 200, a modified source code file 410 in step 606. In some embodiments, the modified source code file 410 includes an identification of a user that created the modified source code file 410 on a user device 250. For example, in some embodiments, the server computing device 200 is configured to store the modified source code file 410 in the database 350.

Process 600 continues by determining, by the server computing device 200, a portion of the source code file that has been modified based on a comparison of the source code file 310 and the modified source code file 410 in step 608. For example, in some embodiments, the server computing device 200 is configured to add the portion of the source code file that has been modified to the record of modifications of the source code.

Process 600 continues by determining, by the server computing device 200, whether the portion of the source code file that has been modified corresponds to an error in the record of source code errors in step 610. Process 600 continues by, in response to determining that the portion of the source code file that has been modified corresponds to an error in the record of source code errors, generating, by the server computing device 200, a notification 460 corresponding to the error in the record of source code errors in step 612.

In some embodiments, the notification 460 includes an email to the user. For example, in some embodiments, the email includes the portion of the source code file that has been modified, the record of modifications of the source code, and the record of source code errors. In other embodiments, the notification 460 includes a message proximate the portion of the source code file that has been modified. In some embodiments, the notification 460 includes a push notification to the user device 250. For example, in some embodiments, the push notification 460 includes the portion of the source code file that has been modified, the record of modifications of the source code, and the record of source code errors.

Process 600 finishes by generating, by the server computing device 200, for display the notification 460 on the user device 250 in step 614. In some embodiments, the server computing device 200 is configured to detect whether the user is attempting to commit the modified source code file 410. For example, in some embodiments, the server computing device 200 is configured to generate a second notification corresponding to the error in the record of source code errors. In some embodiments, the server computing device 200 is configured to prevent the commit of the modified source code file 410.

In some aspects, process 600 can be implemented on a source code management system 320 for preventing source code error reoccurrence. The system includes a server computing device 200 communicatively coupled to a user device 250 and a database 350 over a network 150. The server computing device 200 is configured to receive a source code file 310 including a record of modifications of the source code and a record of source code errors. The server computing device 200 is also configured to store the source code file 310 in the database 350. The server computing device 200 is also configured to receive a modified source code file 410. In some embodiments, the modified source code file 410 includes an identification of a user that created the modified source code file 410 on the user device 250.

Further, the server computing device 200 is configured to determine a portion of the source code file that has been modified based on a comparison of the source code file 310 and the modified source code file 410. The server computing device 200 is also configured to determine whether the portion of the source code file that has been modified corresponds to an error in the record of source code errors. Further, the server computing device 200 is configured to, in response to determining that the portion of the source code file that has been modified corresponds to an error in the record of source code errors, generate a notification 460 corresponding to the error in the record of source code errors. The server computing device 200 is further configured to generate for display the notification 460 on the user device 250.

In some embodiments, the server computing device 200 is further configured to store the modified source code file 410 in the database. For example, in some embodiments, the server computing device 200 is further configured to add the portion of the source code file that has been modified to the record of modifications of the source code.

In some embodiments, the notification 460 includes at least one of an email to the user or a message proximate the portion of the source code file that has been modified. For example, in some embodiments, the email includes the portion of the source code file that has been modified, the record of modifications of the source code, and the record of source code errors.

In some embodiments, the notification 460 is a push notification to the user device 250. For example, in some embodiments, the push notification includes the portion of the source code file that has been modified, the record of modifications of the source code, and the record of source code errors.

In some embodiments, the server computing device 200 is further configured to detect whether the user is attempting to commit the modified source code file 410. For example, in some embodiments, the server computing device 200 is further configured to generate a second notification corresponding to the error in the record of source code errors. In other embodiments, the server computing device 200 is further configured to prevent the commit of the modified source code file 410.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for preventing source code error reoccurrence using a source code management system, the method comprising:
   receiving, by a server computing device, a source code file comprising a record of modifications of the source code and a record of source code errors;
   storing, by the server computing device, the source code file in a database;
   receiving, by the server computing device, a modified source code file, wherein the modified source code file comprises an identification of a user that created the modified source code file on a user device;
   determining, by the server computing device, a portion of the source code file that has been modified based on a comparison of the source code file and the modified source code file;
   determining, by the server computing device, whether the portion of the source code file that has been modified corresponds to one of a plurality of errors in the record of source code errors;
   in response to determining that the portion of the source code file that has been modified corresponds to one of the plurality of errors in the record of source code errors, generating, by the server computing device, a notification corresponding to the one of the plurality of errors in the record of source code errors; and
   generating, by the server computing device, for display the notification on the user device.

2. The computerized method of claim 1, wherein the server computing device is further configured to store the modified source code file in the database.

3. The computerized method of claim 2, wherein the server computing device is further configured to add the portion of the source code file that has been modified to the record of modifications of the source code.

4. The computerized method of claim 1, wherein the notification comprises at least one of an email to the user or a message proximate the portion of the source code file that has been modified.

5. The computerized method of claim 4, wherein the email comprises the portion of the source code file that has been modified, the record of modifications of the source code, and the record of source code errors.

6. The computerized method of claim 1, wherein the notification comprises a push notification to the user device.

7. The computerized method of claim 6, wherein the push notification comprises the portion of the source code file that has been modified, the record of modifications of the source code, and the record of source code errors.

8. The computerized method of claim 1, wherein the server computing device is further configured to detect whether the user is attempting to commit the modified source code file.

9. The computerized method of claim 8, wherein the server computing device is further configured to generate a second notification corresponding to the one of the plurality of errors in the record of source code errors.

10. The computerized method of claim 8, wherein the server computing device is further configured to prevent the commit of the modified source code file.

11. A source code management system for preventing source code error reoccurrence, the system comprising:
    a server computing device communicatively coupled to a user device and a database over a network, the server computing device configured to:
       receive a source code file comprising a record of modifications of the source code and a record of source code errors;
       store the source code file in the database;
       receive a modified source code file, wherein the modified source code file comprises an identification of a user that created the modified source code file on the user device;
       determine a portion of the source code file that has been modified based on a comparison of the source code file and the modified source code file;
       determine whether the portion of the source code file that has been modified corresponds to one of a plurality of errors in the record of source code errors;
       in response to determining that the portion of the source code file that has been modified corresponds to one of the plurality of errors in the record of source code errors, generate a notification corresponding to the one of the plurality of errors in the record of source code errors; and
       generate for display the notification on the user device.

12. The system of claim 11, wherein the server computing device is further configured to store the modified source code file in the database.

13. The system of claim 12, wherein the server computing device is further configured to add the portion of the source code file that has been modified to the record of modifications of the source code.

14. The system of claim 11, wherein the notification comprises at least one of an email to the user or a message proximate the portion of the source code file that has been modified.

15. The system of claim 14, wherein the email comprises the portion of the source code file that has been modified, the record of modifications of the source code, and the record of source code errors.

16. The system of claim 11, wherein the notification comprises a push notification to the user device.

17. The system of claim 16, wherein the push notification comprises the portion of the source code file that has been modified, the record of modifications of the source code, and the record of source code errors.

18. The system of claim 11, wherein the server computing device is further configured to detect whether the user is attempting to commit the modified source code file.

19. The system of claim 18, wherein the server computing device is further configured to generate a second notification corresponding to the one of the plurality of errors in the record of source code errors.

20. The system of claim 18, wherein the server computing device is further configured to prevent the commit of the modified source code file.

* * * * *